(12) United States Patent
Chvatal et al.

(10) Patent No.: US 9,733,666 B2
(45) Date of Patent: Aug. 15, 2017

(54) MAGNETS AT DISPLAY COMPONENT AND BASE

(71) Applicant: Hewlett-Packard Development Company, L.P., Houston, TX (US)

(72) Inventors: Gary J. Chvatal, Houston, TX (US); Wen-Hua Ni, Taipei (TW); Kuan-Hsueh Lee, Taipei (TW); Eric Chen, Houston, TX (US); Hui Leng Lim, Sugar Land, TX (US); Britt C. Ashcraft, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 86 days.

(21) Appl. No.: 14/437,292

(22) PCT Filed: Nov. 9, 2012

(86) PCT No.: PCT/US2012/064310
§ 371 (c)(1),
(2) Date: Apr. 21, 2015

(87) PCT Pub. No.: WO2014/074102
PCT Pub. Date: May 15, 2014

(65) Prior Publication Data
US 2015/0286249 A1  Oct. 8, 2015

(51) Int. Cl.
*H05K 5/00* (2006.01)
*H05K 7/00* (2006.01)
*G06F 1/16* (2006.01)

(52) U.S. Cl.
CPC ............ *G06F 1/1618* (2013.01); *G06F 1/162* (2013.01); *G06F 1/1615* (2013.01); *G06F 1/1679* (2013.01); *G06F 1/1681* (2013.01)

(58) Field of Classification Search
CPC ........................................................ H05K 5/00
USPC ................................................... 361/679.21
See application file for complete search history.

(56) References Cited

U.S. PATENT DOCUMENTS

| 7,054,149 B2 | 5/2006 | Lev et al. |
| 7,082,035 B2 | 7/2006 | Kim |
| 7,775,567 B2 | 8/2010 | Ligtenberg et al. |
| 8,149,573 B2 | 4/2012 | Wu et al. |
| 2004/0189017 A1 | 9/2004 | Chen et al. |
| 2004/0227730 A1 | 11/2004 | Sugihara |
| 2005/0128695 A1 | 6/2005 | Han |

(Continued)

FOREIGN PATENT DOCUMENTS

| EP | 2044499 | 8/2009 |
| EP | 2466420 A1 | 6/2012 |

(Continued)

OTHER PUBLICATIONS

PCT; "Notification of Transmittal of the International Search Report and the Written Opinion of the International Searching Authority, or the Declaration"; cited in PCT/US2012/064310; mailed May 15, 2013; 9 pages.

*Primary Examiner* — Jerry Wu
(74) *Attorney, Agent, or Firm* — HP Patent Department (57) ABSTRACT

A computing device with a hinge coupled to a display component and to a base for the display component to reposition relative to the base, a first set of magnets at first locations of the display component and the base, and a second set of magnets at second locations of the display component and the base.

11 Claims, 5 Drawing Sheets

(56) References Cited

U.S. PATENT DOCUMENTS

| | | |
|---|---|---|
| 2005/0236848 A1 | 10/2005 | Kim |
| 2006/0203437 A1 | 9/2006 | Lev et al. |
| 2007/0138806 A1* | 6/2007 | Ligtenberg ............... E05C 19/16 292/251.5 |
| 2008/0179895 A1 | 7/2008 | Lin |
| 2009/0009950 A1* | 1/2009 | Hattori .................... G06F 1/162 361/679.27 |
| 2010/0238620 A1 | 9/2010 | Fish |
| 2012/0140397 A1 | 6/2012 | Degner et al. |
| 2012/0206873 A1 | 8/2012 | Schwager et al. |

FOREIGN PATENT DOCUMENTS

| | | | | |
|---|---|---|---|---|
| FR | DE 202010006012 U1 * | 9/2010 | ............... B42D 3/10 |
| KR | 20080046360 A | 5/2008 | | |

* cited by examiner

MAGNETS AT DISPLAY COMPONENT AND BASE

BACKGROUND

A notebook can include a display component and a base. The display component can include latches or hooks to engage cavities of the base for the display component to be secured to the base when the notebook is in a closed position. If a user would like to open the notebook from the closed position, a user can disengage the latches or hooks from the cavities of the base and proceed to rotate the display component of the notebook away from the base to an open position.

BRIEF DESCRIPTION OF THE DRAWINGS

In the accompanying drawings, like numerals refer to like components or blocks. The following detailed description references the drawings, wherein.

DETAILED DESCRIPTION

A computing device includes a hinge to couple a display component to a base of the computing device. The hinge is a hardware component for the display component to reposition around two or more axes, such as a y-axis and a z-axis, relative to the base. The computing device includes a first set of magnets at first locations of the display component and the base. In one example, the first locations include corners of the display component and corners of the base. The computing device includes a second set of magnets at second locations of the display component and the base. In one example, the second locations include a central portion of the display component and a central portion of the base.

The display component repositions around two or more axes relative to the base for the computing device to transition between a first mode and a second mode, such as a notebook mode and a tablet mode. For the purposes of this application, the computing device is in a notebook mode if the display component is facing inwards towards the base of the computing device. The computing device is in a tablet mode if the computing device is in a closed position and the display component is rotated relative to the base, such that the display component is facing outwards, away from the base.

The computing device is in the closed position if the display component is substantially parallel to the base of the computing device and the first set of magnets of the display component and the base align and attract to one another. When the computing device is in a closed position of the notebook mode, the first set of magnets of the display component and the base are aligned to attract to one another, whereas the second set of magnets at the second locations of the display component and the base are offset and do not align with one another.

The computing device transitions from the closed position of the notebook mode to an open position of the computing device by rotating the display component around a y-axis relative to the base. The computing device is in the open position if the display component is not substantially parallel to the base. When the computing device is in the open position, the first set of magnets at the display component and the base do not attract to one another. If the computing device is in the open position, the display component can rotate relative to a z-axis of the base for the display component to face outwards, away from the base. The display component can then rotate back from the open position to the closed position for the computing device to transition to the tablet mode, When in the tablet mode, the first set of magnets and the second set of magnets of the display component and the base align to one another.

By aligning the first set of magnets and/or the second set of magnets when the computing device is in a closed position, a pulling force is applied between the magnets for the display component and the base to resist a swaying or swivel motion around the z-axis of the base when the computing device is in the closed position. Further, by aligning both the first set of magnets and the second set of magnets when the computing device is in a closed position of the tablet mode, both the first set of magnets and the second set of magnets attract to one another to provide a greater amount of pulling force for the computing device to remain in the tablet mode and a greater amount of pulling force to resist a swaying or swivel motion.

Figure 1:
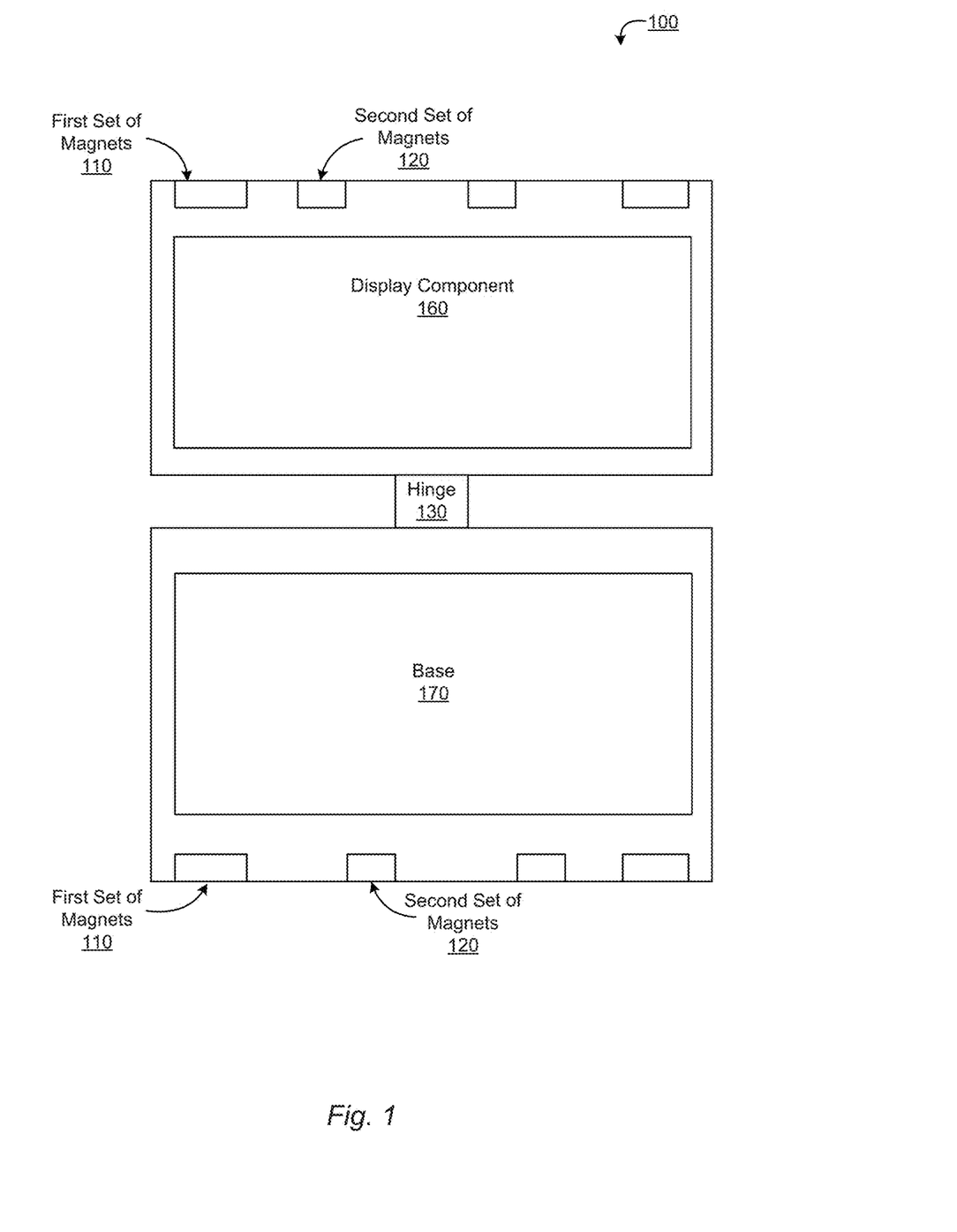
FIG. 1 illustrates a computing device with a hinge and magnets at a display component and a base according to an example.

FIG. 1 illustrates a computing device 100 with a hinge 130 and magnets 110, 120 at portions of a display component 160 and a base 170 according to an example. The computing device 100 can be a notebook, a netbook, a tablet, a smart phone, a cellular device, an all-in-one system, and/or any additional computing device with a hinge 130 to couple with a display component 160 and a base 170, The display component 160 is an output component, such as a liquid crystal display, a light emitting diode display, an in-plane switching technology panel, a cathode ray tube, a touch screen, and/or any additional output component to output images, videos, and/or a user interface for a user of the computing device 100 to view and/or interact with.

The display component 160 can be housed in a top member of the computing device 100, In one implementation, the top member further includes a sensor, such as a touch sensor, a proximity sensor, and/or an image capture component, to detect for inputs from a user of the computing device 100. The base 170 includes a bottom member of the computing device 100 which houses an input component, such as a keyboard and/or a track pad of the computing device 100. In other implementations, other components of the computing device 100, such as a processor, storage component, a main memory, and/or a communication component can be included in the base 170 and/or the display component 160.

For the purposes of this application, the hinge 130 is a mechanical component which couples the display component 160 to the base 170 and allows the display component 160 to reposition around two or more axes relative to the base 170. The hinge 130 can include a latch, hook, magnet, mount, and/or a locking mechanism to couple with the display component 160 and the base 170. The hinge 130 further includes one or more bearings, joints, rods, motors, and/or additional rotating mechanisms for the display component 160 to reposition around two or more axes relative to the base 170. When repositioning around two or more axes, the display component 160 rotates around two different axes, such as a y-axis and a z-axis, relative to the base 170. In one implementation, the hinge 130 further includes electrical components or connections for the display component 160 to electrically couple with the base 170

The display component 160 and the base 170 include a first set of magnets 110 and a second set of magnets 120. For the purposes of this application, a magnet includes an object, a substance, a component, and/or a device which produces a magnetic or electromagnetic field. The first set of magnets 110 and the second set of magnets 120 can be permanent or induced magnets. The first set of magnets 110 are positioned at first locations of the display component 160 and the base 170. In one example, the first locations can include a left-corner and a right-corner of the display component 160 and a left-corner and a right-corner of the base 170. The first set of magnets 110 of the display component 160 are aligned with the first set of magnets 110 of the base 170 if the computing device 100 is in a closed position.

The computing device 100 is in a closed position if the display component 160 is substantially parallel to the base 170. When the computing device 100 is in the closed position, the display component 160 can either be facing inwards toward the base 170 or the display component 160 can be facing outwards away from the base 170. If the computing device 100 is in the closed position, the first set of magnets 110 of the display component 160 and the base 170 align to attract one another. For the purposes of this application, a magnet of the display component 160 is aligned with a magnet of the base 170 if the two magnets contact, overlap, or are within close proximity of one another.

The second set of magnets 120 are positioned at second locations of the display component 160 and the base 170. In one example, the second locations include off center portions of the display component 160 and the base 170. The second set of magnets 120 of the display component 160 can be aligned or offset from the second set of magnets 120 of the base 170 based on whether the computing device 100 is in the notebook mode or the tablet mode. For the purposes of this application, the computing device 100 is in a notebook mode if the display component 160 is facing inwards towards the base 170. The computing device 100 is in a tablet mode if the computing device 100 is in a closed position and the display component 160 is rotated such that the display component 160 is facing outwards, away from the base 170.

If the computing device 100 is in a closed position o the notebook mode, the first set of magnets 110 of the display component 160 are aligned with the first set of magnets 110 of the base 170. Further, when the computing device 100 is in the closed position of the notebook mode, the second set of magnets 120 of the display component 160 are not aligned from the second set of magnets 120 of the base 170. If the computing device 100 is in the tablet mode, the first set of magnets 110 of the display component 160 and the first set of magnets 110 at the base 170 are aligned with one another and the second set of magnets 120 of the display component 160 and the second set of magnets 120 of the base 170 are also aligned with one another.

The display component 160 can reposition around two axes relative to the base 170 for the computing device 100 to transition between the notebook mode and the tablet mode. In one example, if the computing device 100 is initially in a closed position of the notebook mode, the display component 160 rotates around a y-axis relative to the base 170 to transition into an open position. The display component 160 then rotates around a z-axis relative to the base 170 for the display component 160 to face outwards and away from the base 170. The display component 160 then transitions to the tablet mode by rotating back around the y-axis relative to the base 170 such the display component 160 is facing away from the base 170 and the computing device 100 is in the closed position.

Figure 2A:
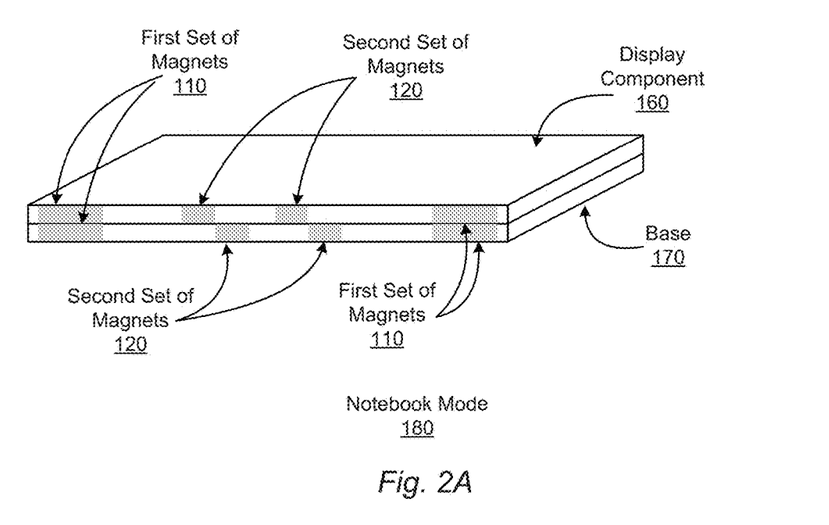
FIG. 2A and FIG. 2B illustrate magnets a computing device and the computing device in a first mode according to examples.
Figure 2B:
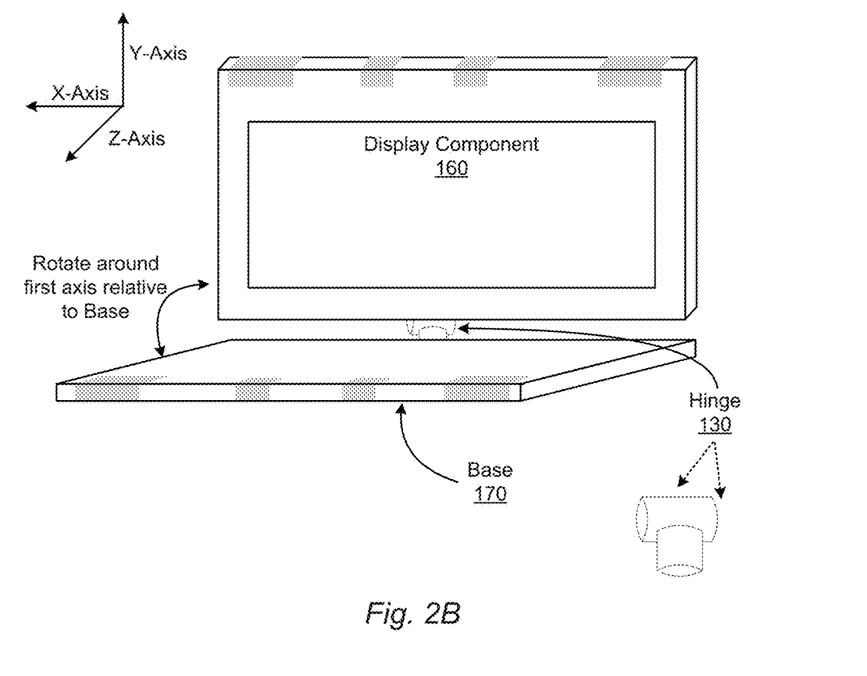

FIG. 2A and FIG. 2B illustrate magnets of a computing device and the computing device in a first mode according to examples. In one implementation, the first set of magnets 110 and the second set of magnets 120 are included within a chassis of the display component 160 and within a chassis of the base 170. The magnets 110, 120 can be included within corners and/or central portions of the display component 160 and the base 170. The magnets 110, 120 can be of a length, width, and/or thickness such that they extend from a front panel of the chassis to a rear panel of the chassis of the display component 160 and the base 170.

In one implementation, the first set of magnets 110 and the second set of magnets 120 can include a first end with a north pole and a second end with a south pole. The first end and the second end of a magnet can correspond to a left portion and right portion of the magnet and/or vice versa. In another implementation, the first end and the second end of the magnet correspond to a top and a bottom of the magnet and/or vice versa. In other implementations, the second set of magnets 120 include either a north pole or a south pole at both ends of the magnets 120. The first set of magnets 110 can be positioned such that the orientation of the first set of magnets 110 at the left-corner and the right-corner of the display component 160 are opposite of one another. The orientation of the first set of magnets 110 at the left-corner and the right-corner of the base 170 are also opposite of one another. Further, the orientation of the first set of magnets 110 of the display component 160 are opposite to the orientation of the first set of magnets 110 of the base 170.

In one example, the magnet 110 at the left-corner of the display component 160 can be oriented North|South and the magnet 110 at the right-corner of the display component 160 can be oriented South|North. Further, the magnet 110 at the left-corner of the base 170 can be oriented South|North and the magnet 110 at the right-corner of the base 170 can be oriented North|South. The first set of magnets 110 of the display component 160 and the base 170 align and attract to one another for the computing device to remain in the closed position and to resist a swivel or swaying motion while the computing device is in a closed position. A magnet of the display component 160 is aligned with a magnet of the base 170 if the two magnets contact, overlap, and/or are within close proximity of one another.

As shown in FIG. 2A, the computing device can be in a closed position of a first mode. The first mode includes a notebook mode 180 of the computing device where the display component 160 is facing inwards towards the base 170 of the computing device. The computing device is in a closed position of the notebook mode 180 if the display component 160 is substantially parallel to the base 170 such that the first set of magnets 110 of the display component 160 align and attract to the first set of magnets 110 of the base 170. When the computing device is in a closed position of the notebook mode 180, the second set of magnets 120 of the display component 160 and the base 170 are offset and do not align with one another.

As shown in FIG. 2B, the display component 160 can rotate around a first axis, such as a y-axis, relative to the base 170 for the computing device to transition to an open position. The computing device is in the open position if the display component 160 is not substantially parallel to the base 170 and if the first set of magnets 110 of the display component 160 and the base 170 are not aligned with one another. For example, the display component 160 can be in the open position if the display component 160 is angled between 30 to 180 degrees relative to the base 170. In another example, the display component 160 can be substantially perpendicular to the base 170 when in the open position.

As shown in FIG. 2B, a hinge 130 couples to the display component 160 and to the base 170. One or more ends of the hinge 130 can include a latch, hook, magnet, a mount, and/or a locking mechanism to couple with the display component 160 and the base 170. The hinge 130 further includes one or more rotating mechanisms for the display component 160 to reposition around two or more axes relative to the base 170. In one example, the hinge 130 includes a horizontal rod and a vertical rod coupled with a joint for the display component 130 to rotate around a first axis and a second axis relative to the base 170. In other implementations, the hinge 130 includes one or more joints, bearings, motors, and/or any additional component for the display component 160 to reposition relative to the base 170.

Figure 3A:
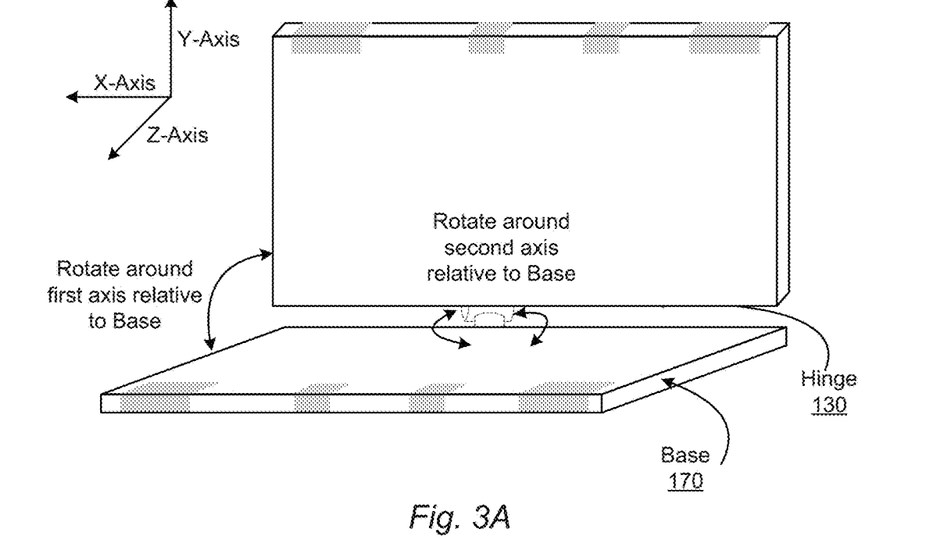
FIG. 3A and FIG. 3B illustrate a computing device repositioning to a second mode according to an example.
Figure 3B:
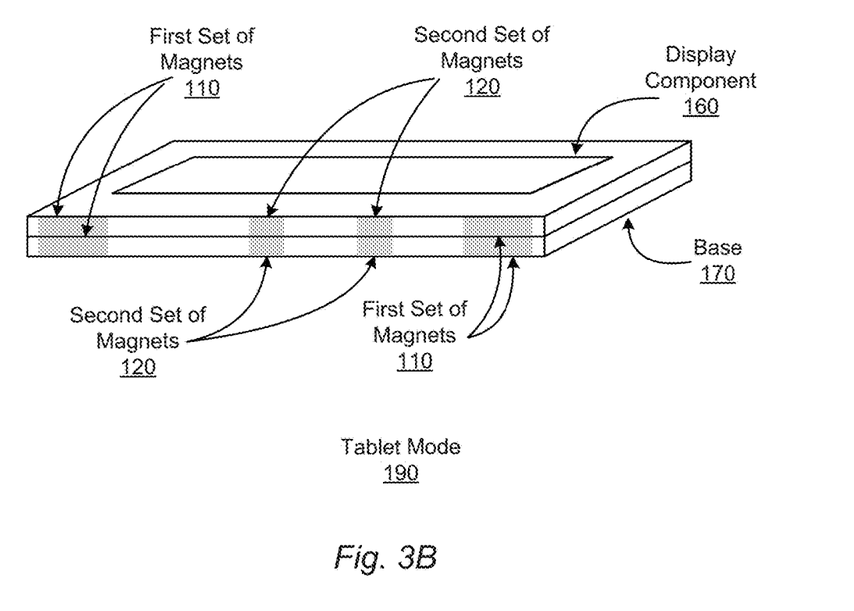

FIG. 3A and FIG. 3B illustrate a computing device repositioning to a second mode according to an example. As shown in FIG. 3A, if the computing device is in an open position, the display component 160 can rotate around a second axis, a z-axis, for the display component 160 to reposition from facing inward toward the base 170 to facing outward away from the base 170 or vice versa. If the display component 160 is facing outwards away from the base 170, the display component 160 can rotate back around the first axis, the y-axis, relative to the base 160 to the closed position for the computing device 100 to transition to a second mode.

The computing device is in a second mode, the tablet mode 190, if the display component 160 is facing outwards, away from the base 170 and if the computing device is in the closed position. As shown in FIG. 3B, when the computing device is in the tablet mode 190, both the first set of magnets 110 and the second set of magnets 120 at the display component 160 and the base 170 align and attract to one another for the computing device to remain in the tablet mode and to resist a swivel or swaying motion while the computing device is in the tablet mode 190.

Figure 4A:
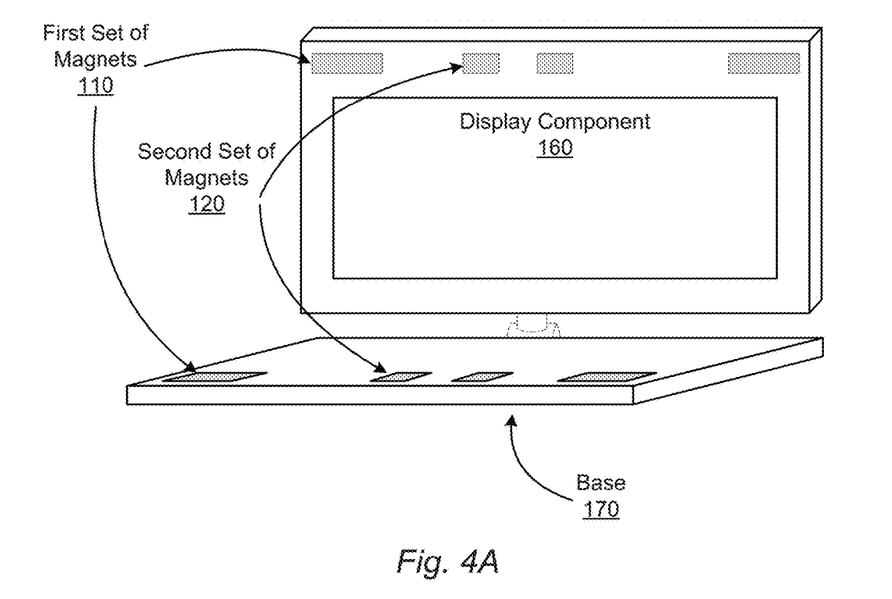
FIG. 4A and FIG. 4B illustrate magnets at locations of a display component and a base according to an example.
Figure 4B:
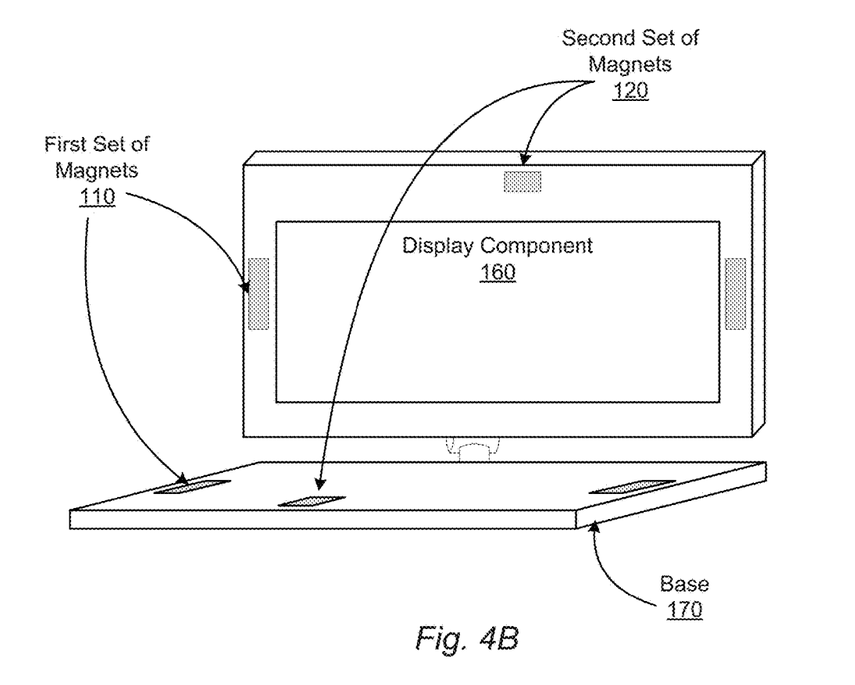

FIG. 4A and FIG. 4B illustrate magnets 110, 120 at locations of a display component 160 and a base 170 according to an example. As shown in FIG. 4A, the first set of magnets 110 includes 4 magnets: a magnet for a left corner and a right corner of the display component 160 and the base 170. The second set of magnets 120 can also include 4 magnets: two offset magnets at a central portion of the display component 160 and two offset magnets at a central portion of the base 170. In another example, as shown in FIG. 4B, the second set of magnets 120 includes 2 magnets: a magnet for a central portion of the display component 160 and another magnet for a central portion of the base 170. In other implementations, the first set of magnets 110 and the second set of magnets 120 can include a different number of magnets in addition to and/or in lieu of those noted above and illustrated in FIG. 4A and FIG. 4B.

As noted above, the first set of magnets 110 and the second set of magnets 120 can be included within a chassis of the display component 160 and within a chassis of the base 170. In another implementation, as shown in FIG. 4A and 4B, the first set of magnets 110 and the second set of magnets 120 can be attached to surfaces of the front and rear panels of the display component 160 and the base 170. In other implementations, the first set of magnets 110 and the second set of magnets 120 can be included within indentions or included at additional locations of the display component 160 and the base 170.

As shown in FIG. 4A and FIG. 4B, the first set of magnets 110 can be included at different corners of the display component 160 and different corners of the base 170. In one example, as shown in FIG. 4A, the first set of magnets 110 can be included at corner locations above the display component 160 and corresponding corner locations of the base 160. In another example, as shown in FIG. 4B, the first set of magnets 110 can be included at corner locations to the left and to the right of the display component 160 and corresponding corner locations of the base 160.

Figure 5:
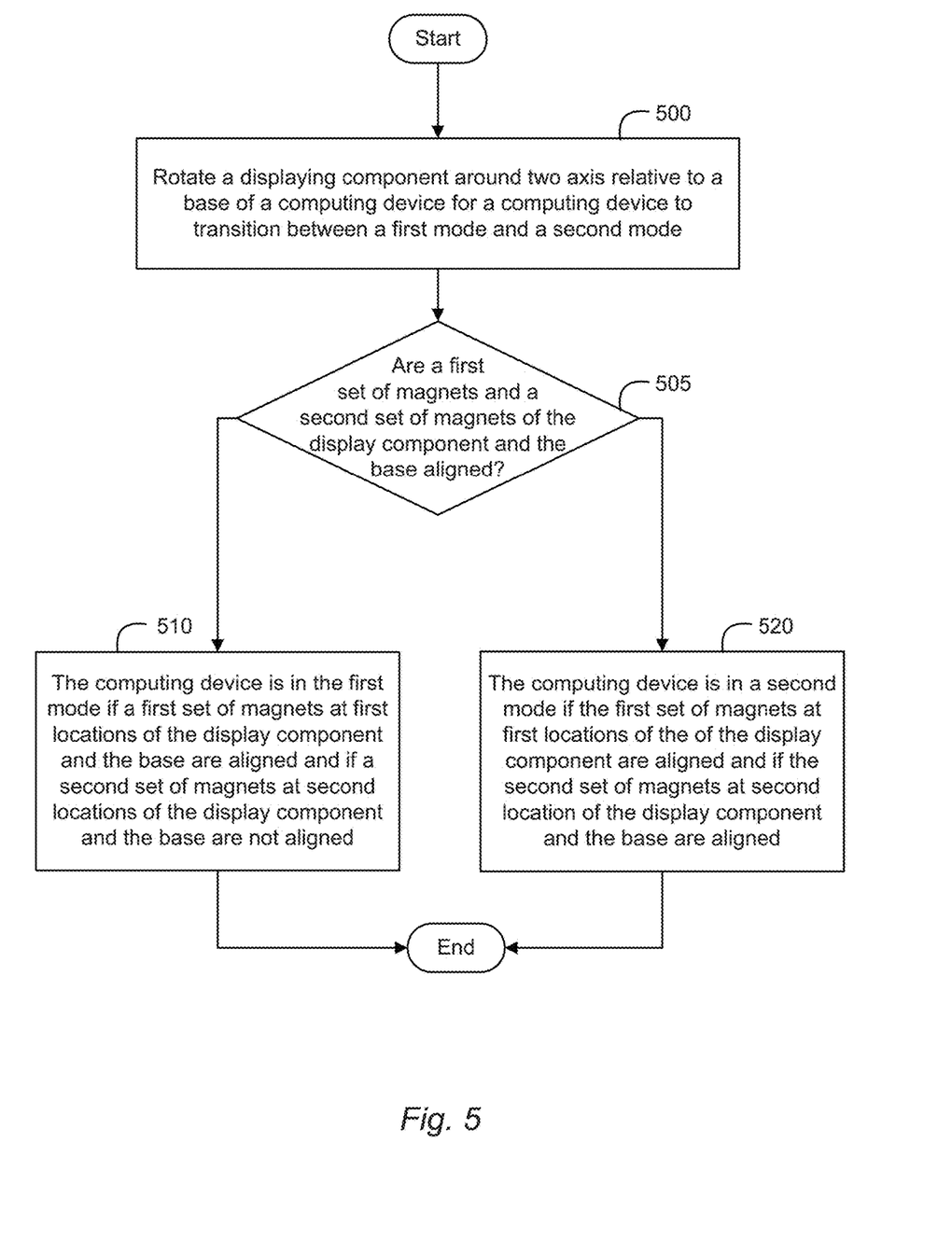
FIG. 5 is a flow chart illustrating a method for a computing device to transition between modes according to an example.

FIG. 5 is a flow chart illustrating a method for a computing device to transition between modes according to an example. The display component can rotate around two axes relative to a base for the computing device to transition between a first mode and a second mode, such as between a notebook mode and a tablet mode at 500. The computing device can be in the first mode or the second mode based on whether a first set of magnets and a second set of magnets of the display component and the base are aligned at 505.

The computing device is in the first mode, the notebook mode, if a first set of magnets at first locations of the display component and the base are aligned and if a second set of magnets at second locations of the display component and the base are not aligned at 510. The computing device is in the second mode, the tablet mode, if the display component rotates around two axes relative to the base and if the first set of magnets at first locations of the of the display component are aligned and if the second set of magnets at second location of the display component and the base are aligned at 520. The method is then complete. In other embodiments, the method of FIG. 5 includes additional steps in addition to and/or in lieu of those depicted in FIG. 5.

What is claimed is:

1. A computing device comprising: a display component; a base; a hinge coupled to the display component and to the base to rotate the display component around two axes relative to the base for the computing device to transition between a notebook mode and a tablet mode; a first set of magnets included at first locations of the display component; a second set of magnets included at first locations of the base; a third set of magnets included at second locations of the display component; and a fourth set of magnets included at second locations of the base; wherein the first set of magnets included at the first locations of the display component and the second set of magnets included at the first locations of the base are aligned when the computing device is in a closed position of the notebook mode and when the computing device is in the tablet mode; wherein the third set of magnets included at the second locations of the display component and the fourth set of magnets included at the second locations of the base are aligned when the computing device is in the tablet mode and are not aligned when the computing device is in the closed position of the notebook mode to provide a less amount of pulling force as compared to the tablet mode.

2. The computing device of claim 1 wherein the first locations of the display component include corners of the display component and wherein the first locations of the base include corners of the base.

3. The computing device of claim 1 wherein the second locations of the display component include a central portion of the display component and wherein the second location of the base include a central portion of the base.

4. The computing device of claim 1 wherein the display component rotates around a first axis relative to the base for the computing device to transition between the closed position and an open position.

5. The computing device of claim 4 wherein the display component rotates around a second axis relative to the base when the computing device is in the open position.

6. A method for a computing device to transition between modes comprising: rotating a displaying component of the computing device around two axes relative to a base of the computing device for the computing device to transition between a first mode and a second mode; wherein the computing device is in the first mode when a first set of magnets at first locations of the display component and a second set of magnets at first locations the base are aligned, and when a third set of magnets at second locations of the display component and a fourth set of magnets at second locations of the base are not aligned; wherein the computing device is in the second mode when the first set of magnets and the second set of magnets are aligned and the third set of magnets and the fourth set of magnets are aligned to provide a greater amount of pulling force as compared to the first mode.

7. The method of claim 6, wherein rotating the display component relative to the base includes rotating the display component around a y-axis relative to the base for the computing device to transition between a closed position and an open position.

8. The method of claim 7, wherein rotating the display component relative to the base includes rotating the display component around a z-axis relative to the base for the display component to reposition between facing inwards towards the base and facing outwards away from the base.

9. A computing device to transition between a first mode and a second mode comprising: a first set of magnets at first locations of a display component and a second set of magnets at first locations of a base; a second third set of magnets at second locations of the display component and a fourth set of magnets at second locations of the base; and a hinge coupled to the display component and to the base for the display component to reposition relative to the base to transition between the first mode and the second mode; wherein the first set of magnets included at the first locations of the display component and the second set of magnets included at the first locations of the base are aligned in both the first mode and the second mode; wherein the third set of magnets included at the second locations of the display component and the fourth set of magnets included at the second locations of the base are aligned in the first mode and not aligned in the second mode to provide a less amount of pulling force as compared to the first mode.

10. The computing device of claim 9, wherein the first set of magnets and the the third set of magnets are included within a chassis of the display component and wherein the second set of magnets and the fourth set of magnets are included within a chassis of the base.

11. The computing device of claim 9, wherein the first set of magnets and the third set of magnets are included at a front panel and a rear panel of a chassis of the display component and wherein the second set of magnets and the fourth set of magnets are included at a front panel and a rear panel of the base.

* * * * *

UNITED STATES PATENT AND TRADEMARK OFFICE
CERTIFICATE OF CORRECTION

PATENT NO. : 9,733,666 B2  
APPLICATION NO. : 14/437292  
DATED : August 15, 2017  
INVENTOR(S) : Gary J. Chvatal et al.

Page 1 of 1

It is certified that error appears in the above-identified patent and that said Letters Patent is hereby corrected as shown below:

In the Claims

In Column 8, Line 7, in Claim 9, delete "second third" and insert -- third --, therefor.

In Column 8, Line 23, in Claim 10, delete "the the" and insert -- the --, therefor.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*